April 4, 1967     H. D. BRAILSFORD     3,312,170
ECCENTRIC WITH VARIABLE STROKE
Filed Oct. 22, 1965
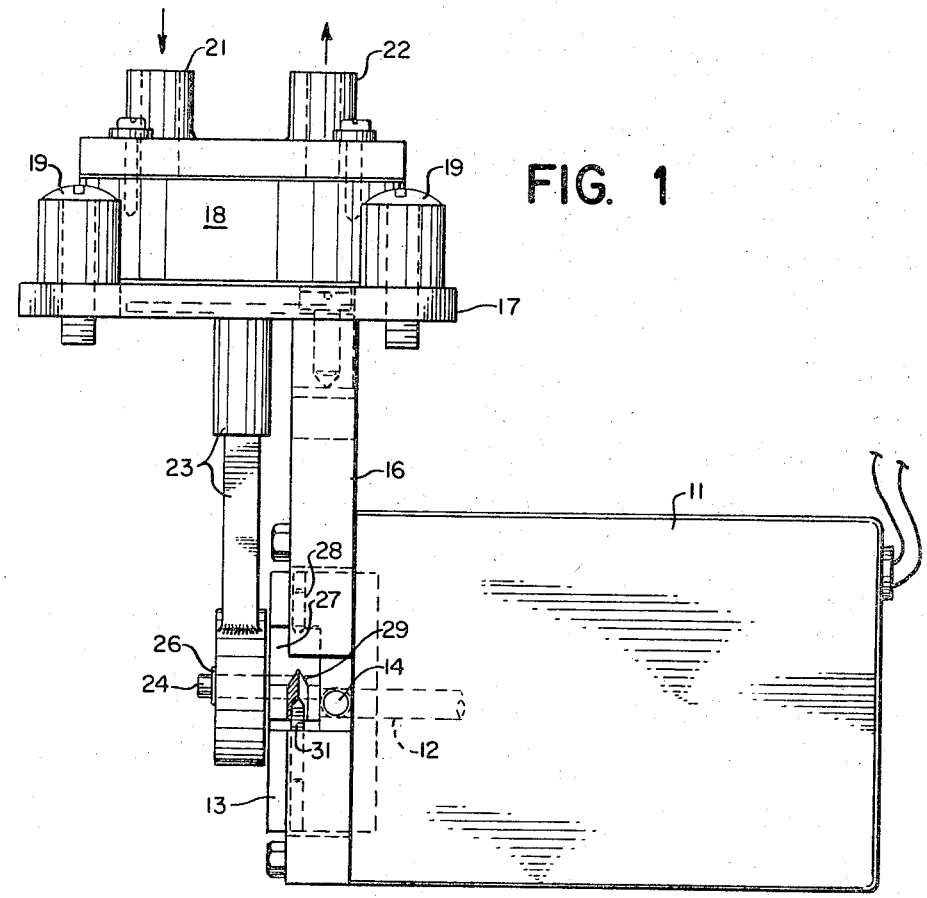
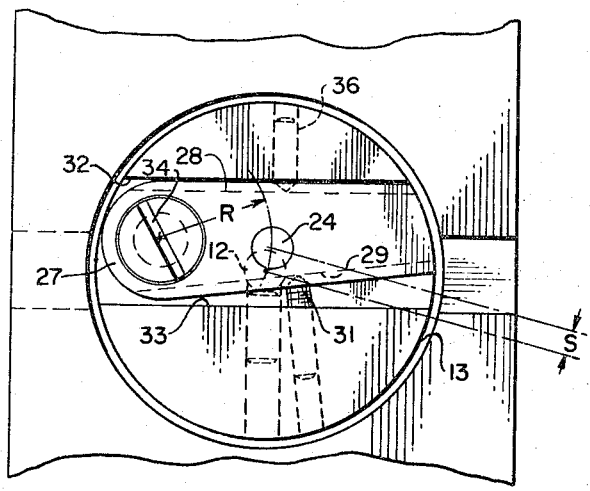
INVENTOR.
HARRISON D. BRAILSFORD
BY
ATTORNEY 3,312,170
ECCENTRIC WITH VARIABLE STROKE
Harrison D. Brailsford, 670 Milton Road,
Rye, N.Y. 10580
Filed Oct. 22, 1965, Ser. No. 500,624
5 Claims. (Cl. 103—38)

This invention relates to an eccentric for transforming rotary motion into linear, or vice versa, including means for varying the stroke of the linear motion for each revolution of the rotary part of the eccentric. In particular the invention relates to an eccentric for varying the output of a pump by setting the stroke of the piston to some value within a predetermined range of stroke lengths by means of a variable eccentric.

One of the objects of the present invention is to provide an eccentric having a stroke length that can be set to any value within a range of values, and in particular to any value from zero, or a very small stroke, to a much larger value.

In accordance with the present invention, a variable eccentric is formed by means of a base, or first member, on which a pivotal member is mounted. The base is either part of or is adapted to be attached to a shaft 14 to rotate therewith and the axis about which the pivotal member pivots is offset from the axis about which the shaft and first member rotate. The pivotal member either has an eccentric crank pin extending from it or is adapted to receive a crank pin, and a locking clamp is provided to lock the pivotal member at one of a number of positions with respect to the first member. The crank pin is offset from the pivot axis so that as the pivotal member is moved from one position to another, the offset of the crank pin from the main axis of the shaft of the first member changes, thus changing the throw of the crank pin and the stroke of any connecting rod attached thereto.

The invention will be described in greater detail hereinafter in connection with the drawings in which:

FIG. 1 shows a side view of a motor and pump including a variable eccentric in accordance with the invention; and FIG. 2 is a front view of the eccentric of FIG. 1.

The apparatus in FIG. 1 includes a motor 11 having an output shaft 12, which may be connected to the motor either directly or through a speed changing mechanism in accordance with practice well-known in the art. An eccentric base member, or first member, 13 is attached to the shaft by means of one or more set screws 14 so that the member 13 will rotate with the shaft and on the same axis. The motor is attached to a support structure comprising an upright member 16 and a pump support 17 at right angles thereto. While the member 16 is spoken of as being upright, it is to be understood that this designation is only for convenience and that the mechanism can operate with the member 16 in other positions besides the vertical position shown.

A pump 18 is attached to the pump support 17 by means of a plurality of machine screws 19 and includes an inlet pipe 21 and an outlet pipe 22 for connection to a fluid pump system. The pump includes a piston (not shown) and a connecting rod 23 to drive the piston up and down as the shaft 12 rotates.

The connecting rod 23 is joined to the shaft by means of an eccentric, and specifically, is attached to a crank pin 24 and is held in place thereon by a C-washer 26. The crank pin extends from the pivotal member 27, which has a generally rectangular cross-section that is provided with two grooves 28 and 29 into which a pair of set screws press. One of the set screws 31 is shown in this figure but the other set screw is not visible.

The front view of the eccentric is shown enlarged in FIG. 2. The base member 13 has two abutments 32 and 33 that extend from one surface thereof and limit the extent of movement of the pivotal member 27. The latter pivots about the axis of a set screw 34, which may form the clamping means for holding the eccentric in place with respect to the base member 13. However, it is preferable to provide additional clamping means in the form of the set screw 31 and a second set screw 36 that extend more or less radially through the base member 13 and particularly through the abutment walls 32 and 33 into contact with the sides of the pivotal member 27 which converge to permit pivotal movement of this member. The pivotal member, in the present embodiment, has a crank pin 24 firmly attached thereto to extend parallel to the axis of the shaft 12.

The axis of the crank pin 24 is also parallel to the axis of the screw 34 and is offset therefrom by a distance R. In the present embodiment this is the same distance as the offset of the pivot axis of the screw 34 from the axis of the shaft 12, and the movement of the pivotal member 27 within the limits of the abutment walls 32 and 33 changes the distance, or offset, of the axis of the pin 24 from the axis of the shaft 12 by a maximum amount S. The pivotal member 27 is shown set for the largest offset of the crank pin 24 from the shaft 12, from which position it may be pivoted clockwise with respect to the base member 13 to bring the crank pin directly into alignment with the shaft 12, thus reducing the stroke of the connecting rod 23 in FIG. 1 to zero. In order to obtain a maximum offset of the crank pin 24 in a device which will also permit the crank pin to be aligned with the shaft 12, the abutment walls 32 and 33, which may be produced by milling or otherwise forming a slot in one face of the base member 13, may be offset from the axis of the shaft 12, as shown. By making the thickness of the pivotal member 23 approximately equal to the depth of the slot that forms the abutments 32 and 33, the eccentric remains substantially balanced, which may be necessary for high speed operation.

While this invention has been described in terms of a specific embodiment, it will be recognized by those skilled in the art that modifications can be made therein within the scope of the following claims.

What is claimed is:

1. A variable rate pump comprising: a motor having a shaft having a first axis; a disc attached rigidly to one end of said shaft to rotate therewith; a pair of abutments on the surface of said disc facing away from said shaft, said abutments defining a slot in said surface of said disc; a pivotal member; a pivot screw attaching said pivotal member to said disc in said slot, the axis of said screw being offset with respect to said first axis; a crank pin rigidly attached to said pivotal member and extending therefrom in a direction away from said disc and having an axis parallel to said first axis; a pair of set screws, each of said set screws extending through one of said abutments and engaging opposite sides of said pivotal member to clamp said pivotal member to a specific orientation within said slot, the distance between said pivot screw and said crank pin being substantially equal to the distance between said first and said pivot screw axis, whereby pivoting of said pivotal member adjusts the crank pin stroke; a connecting rod rotatably mounted on said crank pin; a piston attached to said connecting rod to be moved thereby; and a cylinder and diaphragm means cooperating with said piston to provide a fluid pump, the amount of fluid pumped per revolution of said disc being determined by the setting of said pivotal member with respect to said disc.

2. A variable eccentric comprising: a disc adapted to be attached rigidly to an axle to rotate therewith on a first axis, said disc having a slot in one end surface thereof; a pivotal member; a support for said pivotal member on said disc within said slot to permit said pivotal member to pivot within the confines of said slot about a pivot axis parallel to and displaced from said first axis; a pair of set screws on opposite sides of said disc and extending through opposite walls of said slot to engage opposite sides of said pivotal member to clamp said pivotal member rigidly with respect to said disc; and a crank pin extending from said pivotal member parallel to the axis of said axle and on the other side of said pivotal member from said disc, the axis of said crank pin being displaced from said pivot axis by a distance substantially equal to the displacement of said pivot axis from said first axis whereby cooperative movement of said set screws can move said axis of said crank pin into and out of substantial alignment with said first axis to change the length of crank pin stroke.

3. An adjustable eccentric according to claim 2 in which said slot is offset from the center of said disc.

4. An adjustable eccentric according to claim 2 in which said pivotal member is an elongated bar and has grooves along opposite sides to receive the ends of said set screws.

5. An adjustable eccentric according to claim 4 in which said pivotal member is tapered so that said opposite sides converge together from the end at which said pivot axis is located.

References Cited by the Examiner

UNITED STATES PATENTS

| | | | |
|---|---|---|---|
| 130,878 | 8/1872 | Stiles | 74—571 |
| 214,805 | 4/1879 | Bennett | 74—600 |
| 241,488 | 5/1881 | Gould | 103—38 |
| 429,749 | 6/1890 | Wood | 74—600 |
| 815,232 | 3/1906 | Taylor | 74—571 |
| 1,137,757 | 5/1915 | Headson | 74—600 |
| 1,796,753 | 3/1931 | Green | 103—38 |
| 2,293,675 | 8/1942 | Martin | 103—38 |

LAURENCE V. EFNER, *Primary Examiner.*